United States Patent
Tu et al.

(10) Patent No.: US 12,521,204 B1
(45) Date of Patent: Jan. 13, 2026

(54) DEVICE MANAGEMENT METHOD AND RELATED APPARATUS

(71) Applicant: ROBGENIX MEDICAL PTE. LTD., Singapore (SG)

(72) Inventors: Wenbin Tu, Shanghai (CN); Sa Xiao, Shanghai (CN); Haifeng Wang, Shanghai (CN); Cunwang Ge, Shanghai (CN); Gang Wu, Shanghai (CN)

(73) Assignee: ROBGENIX MEDICAL PTE. LTD., Singapore (SG)

( * ) Notice: Subject to any disclaimer, the term of this patent is extended or adjusted under 35 U.S.C. 154(b) by 0 days.

(21) Appl. No.: 19/175,706

(22) Filed: Apr. 10, 2025

Related U.S. Application Data

(63) Continuation of application No. PCT/CN2024/140582, filed on Dec. 19, 2024.

(30) Foreign Application Priority Data

Aug. 15, 2024 (CN) .......................... 202411126130.X

(51) Int. Cl.
*A61B 90/96* (2016.01)
*A61B 90/00* (2016.01)
(Continued)

(52) U.S. Cl.
CPC ............ *A61B 90/96* (2016.02); *G06K 7/1417* (2013.01); *G16H 40/40* (2018.01); *A61B 2090/0803* (2016.02)

(58) Field of Classification Search
CPC ............ A61B 90/96; A61B 2090/0803; G06K 7/1417; G16H 40/40
See application file for complete search history.

(56) References Cited

U.S. PATENT DOCUMENTS

2020/0405301 A1* 12/2020 Shelton, IV ......... A61B 17/115

FOREIGN PATENT DOCUMENTS

| CN | 208689951 U | 4/2019 |
|---|---|---|
| CN | 113903445 A | 1/2022 |

(Continued)

OTHER PUBLICATIONS

Yoshikawa T, Kimura E, Akama E, Nakao H, Yorozuya T, Ishihara K. Prediction of the service life of surgical instruments from the surgical instrument management system log using radio frequency identification. BMC Health Serv Res. Oct. 15, 2019 (Year: 2019).*

(Continued)

*Primary Examiner* — Matthew Mikels
(74) *Attorney, Agent, or Firm* — Nixon & Vanderhye P.C.

(57) ABSTRACT

The present disclosure provides a device management method and related apparatus, including: obtaining, by a backend server, target QR code information transmitted by a terminal device, the target QR code information is obtained through scanning a plurality of target QR codes by a scanning interface of the terminal device under a user account, and the target QR codes are respectively arranged on a plurality of target devices; determining, by the backend server, usage times corresponding to each of the target devices based on the target QR code information; generating by the backend server a usage verification code for using the target devices and transmitting the usage verification code to the terminal device, if the usage times meet usage safety requirements; preventing the backend server from generating the usage verification code, if the usage times do not meet the requirements. Therefore, management costs can be reduced, and efficiency can be improved.

14 Claims, 3 Drawing Sheets

(51) Int. Cl.
  *G06K 7/14*   (2006.01)
  *G16H 40/40*  (2018.01)

(56) References Cited

FOREIGN PATENT DOCUMENTS

| | | |
|---|---|---|
| CN | 114548944 A | 5/2022 |
| CN | 115001803 A | 9/2022 |

OTHER PUBLICATIONS

Written Opinion mailed Apr. 11, 2025 in International Application No. PCT/CN2024/140582, with English translation, 15 pages.
Zhao C.Y., "Informatization Practice for Nosocomial Infection Prevention and Control Related to Reusable Meidcal Equipment," Chinese Nursing Research, vol. 34 (20), Oct. 25, 2020, pp. 3731-3733.

\* cited by examiner

DEVICE MANAGEMENT METHOD AND RELATED APPARATUS

CROSS-REFERENCE TO RELATED APPLICATIONS

This application is a continuation of International Application No. PCT/CN2024/140582, filed on Dec. 19, 2024, which claims the priority to Chinese Patent Application No. CN202411126130.X filed on Aug. 15, 2024, and entitled "Device Management Method and Related Apparatus", the entire disclosure of which is incorporated by reference herein.

TECHNICAL FIELD

The present disclosure relates to the field of device, and more specifically, to a device management method and related apparatus.

BACKGROUND

In the prior art, passive surgical instruments are typically operated manually by doctors. For some complex surgical procedures or instruments, due to their high difficulty in operation, the high level of technical skill and clinical experience required results in a steep learning curve for doctors, which restricts the clinical application of surgical instruments to a certain extent. In this regard, a surgical assistance system can remotely operate actuators to drive passive surgical instruments, thereby freeing doctors from manual operations, lowering the surgical threshold, and allowing the doctor to avoid radiation from rays, which is a very advanced surgical operation method.

During the operation through the surgical assistance system, it is necessary to manage the devices used in the surgical assistance system, while in the prior art, the device is typically managed manually, which incurs high management costs and low management efficiency.

SUMMARY

Embodiments of the present disclosure at least provide a device management method and related apparatus, which ensures that a usage verification code is obtained by a user only if usage times of each of a plurality of devices meet usage safety requirements through the interaction between a terminal device and a backend server, this enables the automatic management of the plurality of devices in a surgical assistance system, thereby reducing the management costs and improving the management efficiency.

In a first aspect, the present disclosure provides a device management method including:
  obtaining, by a backend server, target Quick Response (QR) code information transmitted by a terminal device, where the target QR code information is obtained through respectively scanning a plurality of target QR codes by a scanning interface of the terminal device under a user account, and the plurality of target QR codes are respectively arranged on a plurality of target devices;
  determining, by the backend server, usage times corresponding to each of the plurality of target devices based on the target QR code information;
  generating, by the backend server, a usage verification code for using the plurality of target devices and transmitting the usage verification code to the terminal device, if the usage times corresponding to each of the plurality of target devices meet usage safety requirements; and
  preventing the backend server from generating the usage verification code, if the usage times corresponding to at least one of the plurality of target devices do not meet the usage safety requirements.

In a second aspect, the present disclosure also provides a device management method, including:
  obtaining, by a terminal device, target QR code information corresponding to a plurality of target QR codes, in response to a scanning operation of respectively scanning the plurality of target QR codes by a scanning interface of the terminal device under a user account, where the plurality of target QR codes are respectively arranged on a plurality of target devices;
  transmitting, by the terminal device, the target QR code information to a backend server; and
  receiving, by the terminal device, a usage verification code for using the plurality of target devices that is generated and transmitted by the backend server, if usage times corresponding to each of the plurality of target devices determined by the backend server based on the target QR code information meet usage safety requirements.

In a third aspect, the present disclosure also provides a device management apparatus, including:
  an acquisition unit configured for a backend server to obtain target QR code information transmitted by a terminal device, where the target QR code information is obtained through respectively scanning a plurality of target QR codes by a scanning interface of the terminal device under a user account, and the plurality of target QR codes are respectively arranged on a plurality of target devices;
  a determination unit configured for the backend server to determine usage times corresponding to each of the plurality of target devices based on the target QR code information; and
  a generation unit configured for the backend server to generate a usage verification code for using the plurality of target devices and transmit the usage verification code to the terminal device if the usage times corresponding to each of the plurality of target devices meet usage safety requirements, and to prevent the backend server from generating the usage verification code if the usage times of at least one of the plurality of target devices do not meet the usage safety requirements.

In a fourth aspect, the present disclosure also provides a device management apparatus, including:
  an obtaining unit configured for a terminal device to obtain target QR code information corresponding to a plurality of target QR codes, in response to a scanning operation of respectively scanning the plurality of target QR codes by a scanning interface of the terminal device under a user account, where the plurality of target QR codes are respectively arranged on a plurality of target devices;
  a transmission unit configured for the terminal device to transmit the target QR code information to a backend server; and
  a reception unit configured for the terminal device to receive a usage verification code generated and transmitted by the backend server for using the plurality of target devices, if usage times corresponding to each of the plurality of target devices determined by the backend server based on the target QR code information meet usage safety requirements.

In a fifth aspect, an embodiment of the present disclosure provides a device management system including a backend server and a terminal device, which are each configured to perform the methods described in the above aspects.

In a sixth aspect, the present disclosure also provides an electronic device including a processor, a memory, and a bus, where the memory is configured to store machine-readable instructions executable by the processor, the processor is configured to communicate with the memory via the bus when the electronic device is in operation, and the machine-readable instructions, when executed by the processor, cause execution of the method described in the above aspects.

In a seventh aspect, the present disclosure further provides a computer-readable storage medium, storing a computer program that, when executed by a processor, performs the method described in the above aspects.

In an eighth aspect, the present disclosure further provides a computer program product, including a computer program that, when executed by a processor, performs the method described in the above aspects.

In summary, the present disclosure provides a device management method and related apparatus, the method including: obtaining, by a backend server, target QR code information transmitted by a terminal device, where the target QR code information is obtained through respectively scanning a plurality of target QR codes by a scanning interface of the terminal device under a user account, and the plurality of target QR codes are respectively arranged on a plurality of target devices; determining, by the backend server, usage times corresponding to each of the plurality of target devices based on the target QR code information; generating, by the backend server, a usage verification code for using the plurality of target devices and transmitting the usage verification code to the terminal device, if the usage times corresponding to each of the plurality of target devices meet usage safety requirements; and preventing the backend server from generating the usage verification code, if the usage times corresponding to at least one of the plurality of target devices do not meet the usage safety requirements. Based on the above method, it is ensured that a usage verification code is obtained by a user only if the usage times of each of the plurality of devices meet the usage safety requirements through the interaction between a terminal device and a backend server, this enables the automatic management of the plurality of devices in a surgical assistance system, thereby reducing the management costs and improving the management efficiency.

Other advantages of the present disclosure will be explained in more detail in combination with the following description and drawings.

It should be understood that the above description is only an overview of the technical solution of the present disclosure, so that the technical means of the present disclosure can be generally understood and then implemented in accordance with the contents of the specification. In order to make the above and other purposes, features and advantages of the present disclosure more obvious and easier to understand, the following examples are provided to illustrate the specific implementation methods of the present disclosure.

BRIEF DESCRIPTION OF DRAWINGS

In order to more clearly illustrate the technical solution of the embodiment of the present disclosure, the drawings used in the embodiment are briefly introduced below. The drawings herein are incorporated into the specification and constitute a part of the specification, these drawings illustrate embodiments that comply with the present disclosure and are used together with the specification to illustrate the technical solution of the present disclosure. It should be understood that the drawings only illustrate certain embodiments of the present disclosure and should not be regarded as limiting the scope of protection, for those skilled in the art, other relevant drawings can also be obtained based on these drawings without creative labor. Moreover, the same reference numerals represent the same components throughout the drawings. In the drawings.

DETAILED DESCRIPTION

Figure 1:
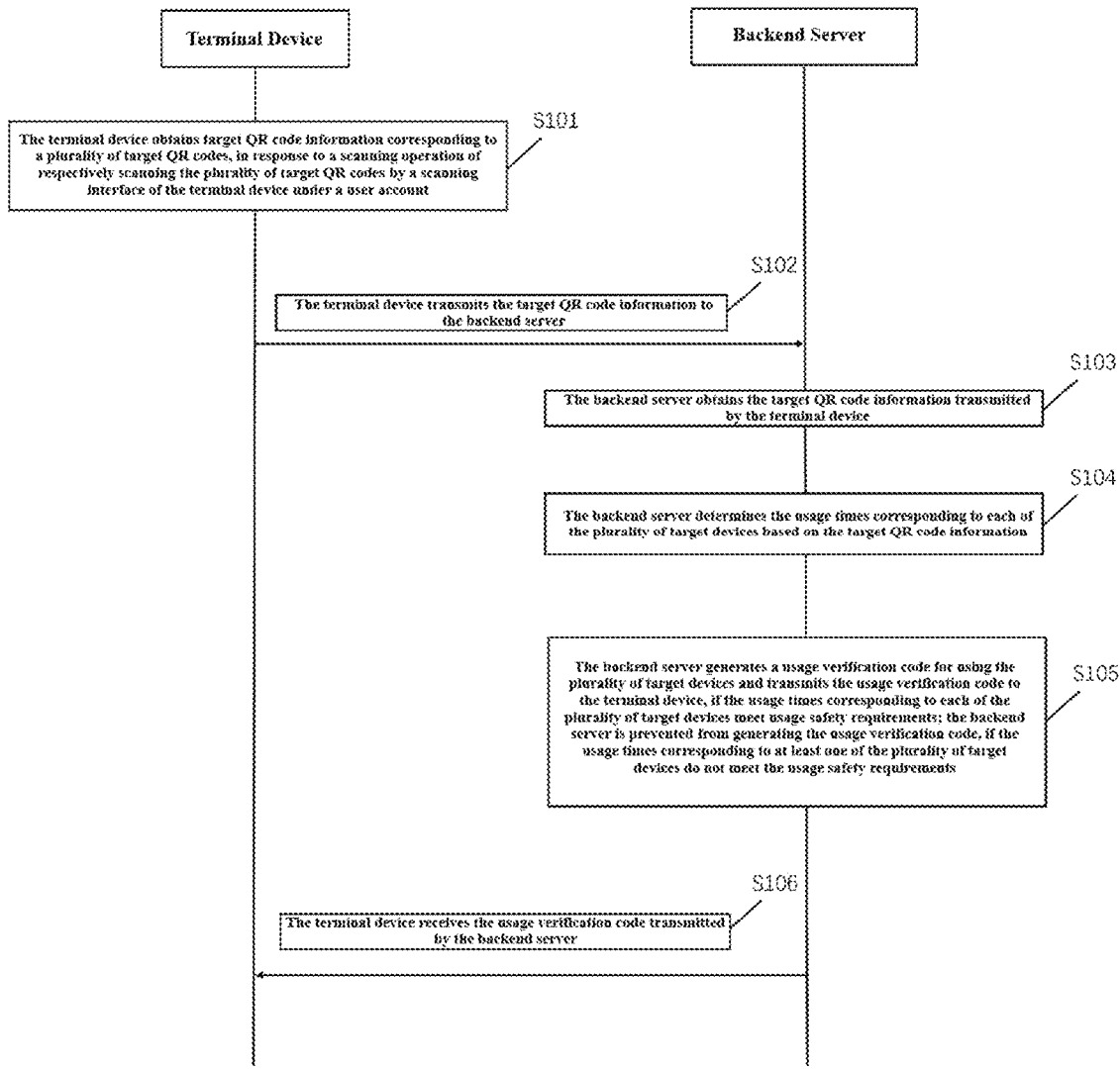
FIG. 1 is a method flowchart of a device management method provided in the embodiment of the present disclosure.

The exemplary embodiments of the present disclosure will be described in more detail below with reference to the accompanying drawings. Although the exemplary embodiments of the present disclosure are shown in the accompanying drawings, it should be understood that the present disclosure can be implemented in various forms and should not be limited by the embodiments described herein. On the contrary, these embodiments are provided to enable a more thorough understanding of the present disclosure and to fully convey the scope of the present disclosure to those skilled in the art.

In the description of the embodiments of the present disclosure, it should be understood that terms such as "including" or "having" are intended to indicate the presence of the disclosed features, numbers, steps, behaviors, components, parts, or combinations thereof in the present specification, and do not exclude the possibility of the presence of one or more other features, numbers, steps, behaviors, components, parts, or combinations thereof.

Unless otherwise specified, "/" indicates the meaning of "or". For example, "A/B" may represent A or B. The term "and/or" herein is merely a way of describing the relationship between associated objects, indicating that there may be three possible relationships, for example, "A and/or B" may represent A existing alone, A and B existing simultaneously, or B existing alone.

The terms "first," "second," etc., are used merely for the convenience of description to distinguish identical or similar technical features and should not be interpreted as indicating or implying the relative importance or quantity of these technical features. Therefore, the features defined by "first", "second", etc. may explicitly or implicitly include one or more of these features. In the description of the embodiments of the present disclosure, unless otherwise specified, the term "plurality of" means two or more than two.

During the surgical process using a surgical assistance system, it is necessary to manage the device used by the surgical assistance system, in the relevant prior art, device is typically managed manually, which results in high management costs and low management efficiency.

In view of this, the present disclosure provides a device management method and related apparatus, which ensures that a usage verification code is obtained by a user only if the usage times of each of the plurality of devices meet the usage safety requirements through the interaction between a terminal device and a backend server, this enables the automatic management of the plurality of devices in a surgical assistance system, thereby reducing the management costs and improving the management efficiency.

The device management method provided by the embodiments of the present disclosure may be implemented through a computer device, which may be a terminal device or a server, where the server may be an independent physical server, a server cluster or distributed system composed of multiple physical servers, or a cloud server providing cloud computing services. Terminal devices include, but are not limited to, mobile phones, computers, intelligent voice interaction devices, smart home appliances, in-vehicle terminals, aircraft, and other similar devices. Terminal devices and servers may be connected directly or indirectly via wired or wireless communication methods, which is not limited in the present disclosure.

It should be understood that in the specific implementation methods of the present disclosure, user-related data such as user information "******" is involved. When the above embodiments of the present disclosure are applied to specific products or technologies, user consent or permission is necessary, and the collection, use, and processing of the related data needs to comply with the relevant laws, regulations, and standards of the countries and regions concerned.

The device management method provided by the present disclosure is described below through method embodiments, as shown in FIG. 1, FIG. 1 is a method flowchart of a device management method provided by an embodiment of the present disclosure, which will be described with the computer device as the terminal device and a backend server, the method includes:

S101, the terminal device obtains target QR code information corresponding to a plurality of target QR codes, in response to a scanning operation of respectively scanning the plurality of target QR codes by a scanning interface of the terminal device under a user account.

The target QR code refers to a QR code arranged on a target device, and the target device refers to a device that needs to be managed during a corresponding surgical procedure performed by using a surgical assistance system.

Since a plurality of target devices are typically required to complete a corresponding surgical procedure by means of a surgical assistance system, a plurality of target QR codes respectively arranged on the plurality of target devices are used in the present disclosure. For example, when three target devices are required to complete a surgical procedure by means of the surgical assistance system, a corresponding target QR code is arranged on each of the three target devices.

In the present disclosure, a user account refers to an account corresponding to a user who needs to obtain a verification code to use a plurality of target devices, a terminal device refers to a device with a scanning function, a scanning interface refers to an interface of a terminal device for scanning a QR code, and a scanning operation refers to an operation of respectively scanning a plurality of target QR codes by the scanning interface of the terminal device under a user account. In an actual application of the present disclosure, the scanning interface may be configured with a plurality of scanning components respectively corresponding to the plurality of target devices, or may be configured with only one scanning component for the plurality of target devices, which is not limited herein.

In the case where the plurality of target QR codes are respectively arranged on a plurality of target devices, in response to a scanning operation of respectively scanning the plurality of target QR codes by the scanning interface of the terminal device under a user account, the terminal device obtains the target QR code information corresponding to the plurality of target QR codes, where the target QR code information refers to the information of the plurality of target devices obtained by scanning the plurality of target QR codes.

S102, the terminal device transmits the target QR code information to the backend server.

After the terminal device obtains the target QR code information corresponding to the plurality of target QR codes in S101, the terminal device transmits the target QR code information to the backend server, the backend server refers to a server that can process the target QR code information to generate and transmit a use verification code, so that the backend server performs relevant processing on the target QR code to obtain the corresponding use verification code.

S103, the backend server obtains the target QR code information transmitted by the terminal device.

After the terminal device transmits the target QR code information to the backend server in S102, the backend server obtains the target QR code information transmitted by the terminal device.

S104, the backend server determines the usage times corresponding to each of the plurality of target devices based on the target QR code information.

After the backend server obtains the target QR code information in S103, since the target QR code information refers to the information of the plurality of target devices obtained by scanning a plurality of target QR codes, the backend server determines the usage times corresponding to the plurality of target devices based on the target QR code information, where the usage times refers to the number of times for which the target device has been used.

S105, the backend server generates a usage verification code for using the plurality of target devices and transmits the usage verification code to the terminal device, if the usage times corresponding to each of the plurality of target devices meet usage safety requirements; and the backend server is prevented from generating the usage verification code, if the usage times corresponding to at least one of the plurality of target devices do not meet the usage safety requirements.

After the usage times corresponding to each of the plurality of target devices are determined in S104, it is necessary to judge the usage times corresponding to each of the plurality of target devices for the sake of usage safety.

If the usage times corresponding to each of the plurality of target devices meet the usage safety requirements which lie in that the usage times of the corresponding target devices do not exceed the maximum usage times, it is meant that the usage times of each of the plurality of target devices do not exceed the maximum usage times, in this case, the backend server may generate a usage verification code for using the plurality of target devices, and the usage verification code may include one or more of numerals, uppercase and lowercase letters, and symbols, which are not limited herein. Further, the backend server transmits the usage verification code to the terminal device so that the relevant users can use the plurality of target devices by using the verification code.

If the usage times corresponding to at least one of the plurality of target devices do not meet the usage safety requirements, it means that the usage times of at least one of the plurality of target devices is greater than the maximum usage times, in this case, the backend server may not generate a usage verification code, thereby preventing the relevant users from using the target device that does not meet the usage safety requirements and ensuring the usage safety of the target device.

It should be noted that in the actual application of the present disclosure, the corresponding usage safety requirements for different target devices may be the same or different. For example, for a target device A, the usage safety requirement for the target device A may be that the usage times of the target device A do not exceed 10, in this case, for a target device B, the usage safety requirement for the target device B may likewise be that the usage times of the target device B do not exceed 10.

S106, the terminal device receives the usage verification code transmitted by the backend server.

After the backend server generates the usage verification code in S105, the terminal device may receive the usage verification code transmitted by the backend server.

In a possible implementation, determining, by the backend server, the usage counts of the plurality of target devices based on the target QR code information in S104 includes:

determining, by the backend server, a device identifier corresponding to each of the plurality of target devices based on the target QR code information;

determining, by the backend server, the usage times corresponding to each of the plurality of target devices based on the device identifier corresponding to each of the plurality of target devices and a previously stored correspondence between the device identifier and the usage times corresponding to each of the plurality of target devices.

Specifically, the device identifier is used to identify the corresponding device. For example, the device identifier may be a Unique Device Identifier (UDI) for a medical device.

The backend server can determine the device identifier corresponding to each of the plurality of target devices based on the target QR code information. In the present disclosure, each of various target devices is provided with a corresponding device identifier for the sake of reliable management of the target devices.

After determining the device identifier corresponding to each of the plurality of target devices, the backend server can directly determine the usage times corresponding to each of the plurality of target devices based on the device identifier corresponding to each of the plurality of target devices as well as a previously stored correspondence between the device identifier and the usage times corresponding to each of the plurality of target devices.

In a possible implementation, in response to a device addition operation on the device management interface of the backend server by an administrator account or a manufacturer account, the backend server is configured to determine a device identifier and device type information of the device to be added, and store the device identifier and the device type information in association with each other, in order for the management of the devices, where the device type information includes a device type and the usage safety requirements corresponding to the device type.

Specifically, the device management interface refers to the relevant interface displayed on the backend server for managing the device.

The administrator account refers to an account that can access all interfaces on the backend server, and the manufacturer account refers to an account that can access the device management interface of the backend server, it should be noted that the above user account refers to an account that can access the scanning interface of the terminal device, that is, in the present disclosure, the administrator account, the manufacturer account and the user account have different permissions.

Since the usage safety requirements for devices of different device types may be different, in this embodiment, the backend server determines the device identifier and device type information of the device to be added, where the device type information includes the device type and the usage safety requirements corresponding to the device type.

After determining the device identifier and the device type information of the device to be added, the backend server may store the device identifier and the device type information in association with each other. Since the device type information includes the usage safety requirements corresponding to the device type, the backend server stores the usage safety requirements of the device in the process of adding the device.

In a possible implementation, in order to achieve device type management, the backend server is configured to determine the device type information and device identifier rules of a device type to be processed, and store the device type information and the device identifier rules of the device type to be processed in association with each other, in response to a device type processing operation on a device type management interface of the backend server by an administrator account, where the device identifier rules include generation rules of the device identifier.

Specifically, the device type management interface refers to the relevant interface displayed on the backend server for managing device types. The administrator account refers to an account that can access all interfaces on the backend server.

In order to implement device type management, in this embodiment, the backend server determines the device type information and device identifier rules of the device type to be processed, in response to the device type processing operation on the device type management interface of the backend server by an administrator account, where the device type information includes a device type and the usage safety requirements corresponding to the device type, and the device identifier rules may include the generation rules of the device identifier.

After determining the device type information and device identifier rules of the device type to be processed, the backend server stores the device type information and device identifier rules of the device type to be processed in association with each other, since the device type information includes the usage safety requirements corresponding to the device type and the device identifier rules include the generation rules of the device identifier, the backend server can manage the usage safety requirements and device identifier generation rules corresponding to different device types in the process of managing the device type, thereby realizing the differentiated management of devices of different device types.

In a possible implementation, in order to create device identifier rules, the backend server creates the device identifier rules corresponding to a device identifier rule creation operation on a device identifier rule interface of the backend server by an administrator account, in response to the device identifier rule creation operation.

Specifically, the device identifier rule interface refers to the relevant interface displayed on the backend server for managing device identifier rules. The administrator account refers to an account that can access all interfaces on the backend server.

The backend server may, in response to a device identifier rule creation operation on the device identifier rule interface of the backend server under an administrator account, create the device identifier rules corresponding to the device identifier rule creation operation. For example, if the device identifier is a UDI code, various device identifier rules may specify which bits to extract from the UDI code.

In a possible implementation, in order to maintain the manufacturer information of the device, the backend server stores a manufacturer identifier in the device identifier and the corresponding manufacturer name in association with each other, in response to a manufacturer management operation on a manufacturer management interface of the backend server by an administrator account.

Specifically, the manufacturer management interface refers to the relevant interface for managing the manufacturer of the device displayed on the backend server. The administrator account refers to an account that can access all interfaces on the backend server.

The backend server may store a manufacturer identifier in the device identifier and the corresponding manufacturer name in association with each other, in response to a manufacturer management operation on a manufacturer management interface of the backend server by an administrator account, for example, when the device identifier is a UDI code, the backend server stores the manufacturer identifier code in the UDI code and the manufacturer name in association with each other, so that the manufacturer information can be correctly identified through the UDI code.

In a possible implementation, in order to better manage the user account using the device, the backend server is configured to determine at least one usage verification code group and a user account corresponding to each usage verification code group, and store each usage verification code group and the corresponding user account in association with each other, in response to a usage verification code grouping operation on a usage verification code grouping interface of the backend server by an administrator account.

Specifically, the verification code grouping interface refers to the relevant interface displayed on the backend server for creating and managing verification code groups. The administrator account refers to an account that can access all interfaces on the backend server.

The backend server may determine at least one usage verification code group and a user account corresponding to each usage verification code group, and store each usage verification code group and the corresponding user account in association with each other, in response to a usage verification code grouping operation on a usage verification code grouping interface of the backend server by an administrator account, that is, the backend server can bind the verification code group and the corresponding user account to better manage the user account of the device.

In a possible implementation, if the verification code group and the corresponding user account are bound, obtaining by the backend server the target QR code information transmitted by the terminal device in S103 includes:

obtaining, by the backend server, the target QR code information and user account information transmitted by the terminal device, where the user account information is information corresponding to the user account that is logged in when the plurality of target QR codes are scanned respectively by the scanning interface of the terminal device;

generating the usage verification code for using the plurality of target devices in S105 includes:

determining, by the backend server, a target usage verification code group corresponding to the user account information based on the user account information and a user account corresponding to each of the previously stored usage verification code groups, in response to a usage verification code group generation operation on a usage verification code management interface of the backend server by an administrator account; and generating, by the backend server, the usage verification code corresponding to the target usage verification code group.

Specifically, if the usage verification code group and the corresponding user account are bound, the backend server obtains the user account information in addition to the target QR code information transmitted by the terminal, where the user account information is the information corresponding to the user account logged in when the plurality of target QR codes are scanned respectively by the scanning interface of the terminal device.

The usage verification code management interface refers to the relevant interface displayed on the backend server for managing the usage verification code for the usage verification code group. The administrator account refers to an account that can access all interfaces on the backend server.

After the user account information is determined by the backend server, the backend server may determine a target usage verification code group corresponding to the user account information based on the user account information and a user account corresponding to each of the previously stored usage verification code groups, in response to a usage verification code group generation operation on a usage verification code management interface of the backend server by an administrator account, and then generate the usage verification code corresponding to the target usage verification code group. That is, the backend server can generate a usage verification code corresponding to the user account information.

In a possible implementation, in order to manage the relevant information of the user account obtaining the verification code, after transmitting the usage verification code to the terminal device, the method further includes:

determining, by the backend server, the associated information corresponding to the usage verification code, and displaying the associated information corresponding to the usage verification code on the usage verification code recording interface of the backend server, where the associated information includes an acquisition time of the usage verification code and the corresponding plurality of target devices.

Specifically, the verification code recording interface refers to the related interface displayed on the backend server for displaying the associated information of the verification code.

After transmitting the verification code to the terminal device, the backend server determines the associated information corresponding to the usage verification code, where the associated information may include an acquisition time of the usage verification code and the corresponding plurality of target devices, after determining the associated information of the verification code, the associated information corresponding to the verification code can be displayed on the verification code recording interface of the backend server.

In a possible implementation, in order to ensure the safety of the device, the backend server stores an authorized user account and authorized user information in association with each other, in response to a user management operation on a user management interface of the backend server by an administrator account.

Specifically, the user management interface refers to the relevant interface displayed on the backend server for managing the user account.

The backend server may store an authorized user account and authorized user information in association with each other, in response to a user management operation on a user management interface of the backend server by an administrator account to avoid unauthorized accounts from obtaining the verification code and ensure the usage safety of the device.

In a possible implementation, it is determined that the user account is logged in and the scanning interface of the terminal device is displayed to the user account, in response to a login operation on a login interface of the terminal device by the user account.

Specifically, the login interface refers to the relevant interface displayed by the terminal device for user account login, in this embodiment, the login method in the login interface can be a variety of login methods such as mobile phone number login or username and password login, which is not limited herein.

The terminal device may determine that the user account is logged in and display the scanning interface of the terminal device to the user account, in response to a login operation on a login interface of the terminal device by the user account.

In a possible implementation, for a surgical assistance system for treating a mitral valve, a plurality of target devices may include a delivery catheter adapter, a guide catheter adapter, and a cannula adapter, when the plurality of target devices include a delivery catheter adapter, a guide catheter adapter, and a cannula adapter, the usage safety requirements for each adapter may be that the usage times is not more than 10 times.

In summary, the present disclosure provides a device management method, including: obtaining, by a backend server, target QR code information transmitted by a terminal device, where the target QR code information is obtained through scanning a plurality of target QR codes by a scanning interface of the terminal device under a user account, and the plurality of target QR codes are respectively arranged on a plurality of target devices; determining, by the backend server, usage times corresponding to each of the plurality of target devices based on the target QR code information; generating, by the backend server, a usage verification code for using the plurality of target devices and transmitting the usage verification code to the terminal device, if the usage times corresponding to each of the plurality of target devices meet usage safety requirements; and preventing the backend server from generating the usage verification code, if the usage times corresponding to at least one of the plurality of target devices do not meet the usage safety requirements. Based on the above method, it is ensured that a usage verification code is obtained by a user only if the usage times of each of the plurality of devices meet the usage safety requirements through the interaction between a terminal device and a backend server, this enables the automatic management of the plurality of devices in a surgical assistance system, thereby reducing the management costs and improving the management efficiency.

In the description of the present specification, reference terms such as such as "some possible embodiments", "some embodiments", "examples", "specific examples", or "some examples" are used to describe that the specific features, structures, materials or characteristics described in conjunction with the embodiment or example are included in at least one embodiment or example of the present disclosure, and the above terms do not necessarily represent the same embodiment or example. Moreover, the described specific features, structures, materials or characteristics can be combined in any one or more embodiments or examples in a suitable manner. In addition, the different embodiments or examples described in the present specification and the features of different embodiments or examples can be combined and combined by those skilled in the art without contradiction.

Regarding the method flowchart of the embodiment of the present disclosure, some operations are described as different steps executed in a certain order. Such a flowchart is illustrative rather than restrictive. Some steps described herein can be grouped together and performed in a single operation, or some steps can be divided into multiple sub-steps, and some steps can be performed in an order different from that shown herein. The various steps shown in the flowchart can be implemented by any circuit structure and/or tangible mechanism (for example, software running on a computer device, hardware (for example, a logical function implemented by a processor or chip), and/or any combination thereof).

Those skilled in the art can understand that in the method described in the above specific embodiments, the writing order of each step does not mean a strict execution order, and the specific execution order of each step should be determined by its function and possible internal logic.

Figure 2:
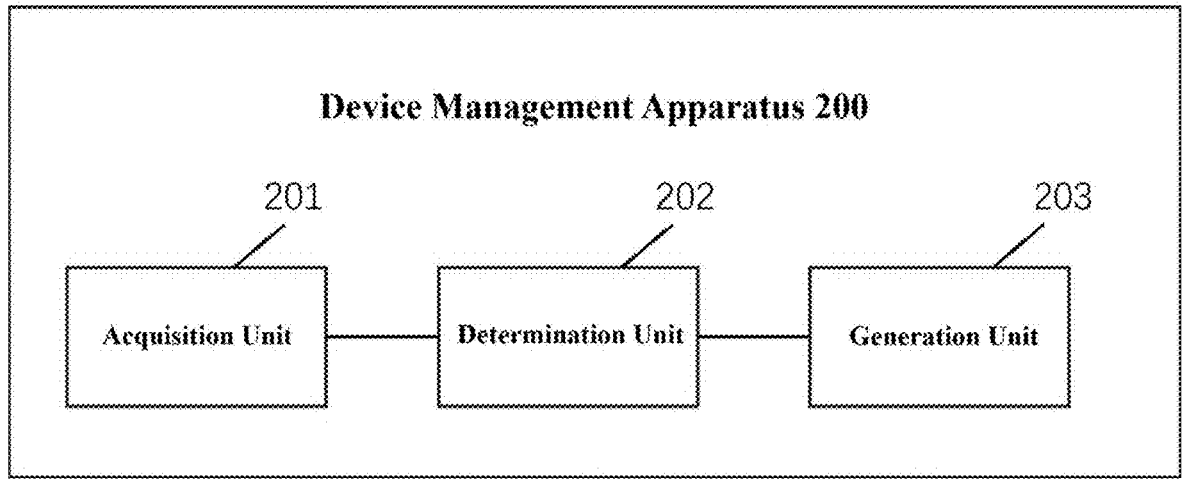
FIG. 2 is a device structure diagram of a device management apparatus provided in the embodiment of the present disclosure.

Based on the above FIG. 1, FIG. 2 is a device structure diagram of a device management apparatus provided in an embodiment of the present disclosure, and the device management apparatus 200 includes:

acquisition unit 201, configured for the backend server to obtain target QR code information transmitted by a terminal device, where the target QR code information is obtained through scanning a plurality of target QR codes by a scanning interface of the terminal device under a user account, and the plurality of target QR codes are respectively arranged on a plurality of target devices;

determination unit 202, configured for the backend server to determine usage times corresponding to each of the plurality of target devices based on the target QR code information;

generation unit 203, configured for the backend server to generate a usage verification code for using the plurality of target devices and transmit the usage verification code to the terminal device if the usage times corresponding to each of the plurality of target devices meet usage safety requirements, and to prevent the backend server from generating the usage verification code if the usage times of at least one of the plurality of target devices do not meet the usage safety requirements.

In a possible implementation, the determination unit 202 is configured for the backend server to:

determine a device identifier corresponding to each of the plurality of target devices based on the target QR code information; and determine the usage times corresponding to each of the plurality of target devices based on the device identifier corresponding to each of the plurality of target devices and a previously stored correspondence between the device identifier and the usage times corresponding to each of the plurality of target devices.

In a possible implementation, the determination unit 202 is further configured for the backend server to:

in response to a device addition operation on the device management interface of the backend server by an administrator account or a manufacturer account, determine a device identifier and device type information of the device to be added, and store the device identifier and the device type information in association with each other, where the device type information includes a device type and the usage safety requirements corresponding to the device type.

In a possible implementation, the determination unit 202 is further configured for the backend server to:

determine the device type information and device identifier rules of the device type to be processed, and store the device type information and device identifier rules in association with each other, in response to a device type processing operation on a device type management interface of the backend server by an administrator account, where the device identifier rules include the generation rules of the device identifier.

In a possible implementation, the device management apparatus 200 further includes a creation unit, which is configured for the backend server to:

in response to a device identifier rule creation operation on the device identifier rule interface of the backend server by an administrator account, create the device identifier rules corresponding to the device identifier rule creation operation.

In a possible implementation, the device management apparatus 200 further includes a storage unit, which is configured for the backend server to:

store a manufacturer identifier in the device identifier and the corresponding manufacturer name in association with each other, in response to a manufacturer management operation on a manufacturer management interface of the backend server by an administrator account.

In a possible implementation, the determination unit 202 is further configured for the backend server to:

determine at least one usage verification code group and a user account corresponding to each usage verification code group, and store each usage verification code group and the corresponding user account in association with each other, in response to a usage verification code grouping operation on a usage verification code grouping interface of the backend server by an administrator account.

In a possible implementation, the acquisition unit 201 is further configured for the backend server to:

obtain the target QR code information and user account information transmitted by the terminal device, where the user account information is the information corresponding to the user account that is logged in when the plurality of target QR codes are scanned respectively by the scanning interface of the terminal device;

The generation unit 203 is configured for the backend server to:

determine a target usage verification code group corresponding to the user account information based on the user account information and user accounts corresponding to the previously stored usage verification code groups, in response to a usage verification code group generation operation on a usage verification code management interface of the backend server by an administrator account;

generate the usage verification code corresponding to the target usage verification code group.

In a possible implementation, the determination unit 202 is further configured for the backend server to:

determine the associated information corresponding to the usage verification code and display the associated information corresponding to the usage verification code on the usage verification code recording interface of the backend server after transmitting the verification code to the terminal device, where the associated information includes an acquisition time of the usage verification code and the corresponding plurality of target devices.

In a possible implementation, the storage unit is further configured for the backend server to:

store an authorized user account and authorized user information in association with each other, in response to a user management operation on a user management interface of the backend server by an administrator account.

In a possible implementation, the plurality of target devices include a delivery catheter adapter, a guide catheter adapter, and a sheath adapter.

It should be noted that the device in the embodiment of the present disclosure can implement each process of the embodiments of the above methods and achieve the same effects and functions, which will not be repeated herein.

Figure 3:
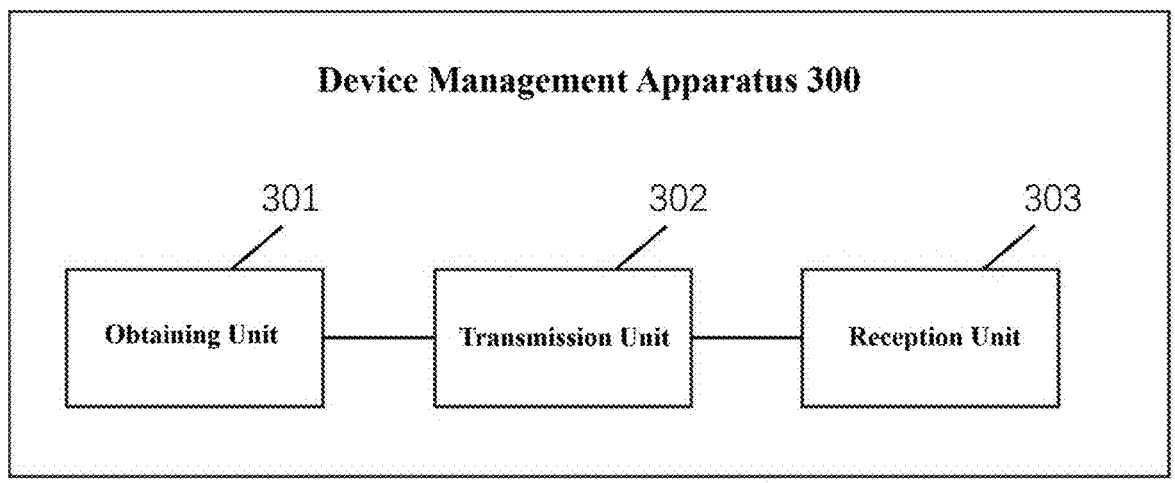
FIG. 3 is a device structure diagram of another device management apparatus provided in the embodiment of the present disclosure.

Based on the above FIG. 1, FIG. 3 is a device structure diagram of another device management apparatus provided in an embodiment of the present disclosure, where the device management apparatus 300 includes:

an obtaining unit 301, configured for a terminal device to obtain target QR code information corresponding to a plurality of target QR codes, in response to a scanning operation of respectively scanning the plurality of target QR codes by a scanning interface of the terminal device under a user account, where the plurality of target QR codes are respectively arranged on a plurality of target devices;

transmission unit 302, configured for the terminal device to transmit the target QR code information to a backend server;

reception unit 303, configured for the terminal device to receive a usage verification code generated and transmitted by the backend server for using the plurality of target devices, if usage times corresponding to each of the plurality of target devices determined by the backend server based on the target QR code information meet usage safety requirements.

In a possible implementation, the device management apparatus 300 further includes a determination unit, which is configured for the terminal device to:

determine that the user account is logged in and display the scanning interface of the terminal device to the user account, in response to a login operation on a login interface of the terminal device by the user account.

It should be noted that the device in the embodiment of the present disclosure can implement each process of the embodiments of the above methods and achieve the same effects and functions, which will not be repeated herein.

Figure 4:
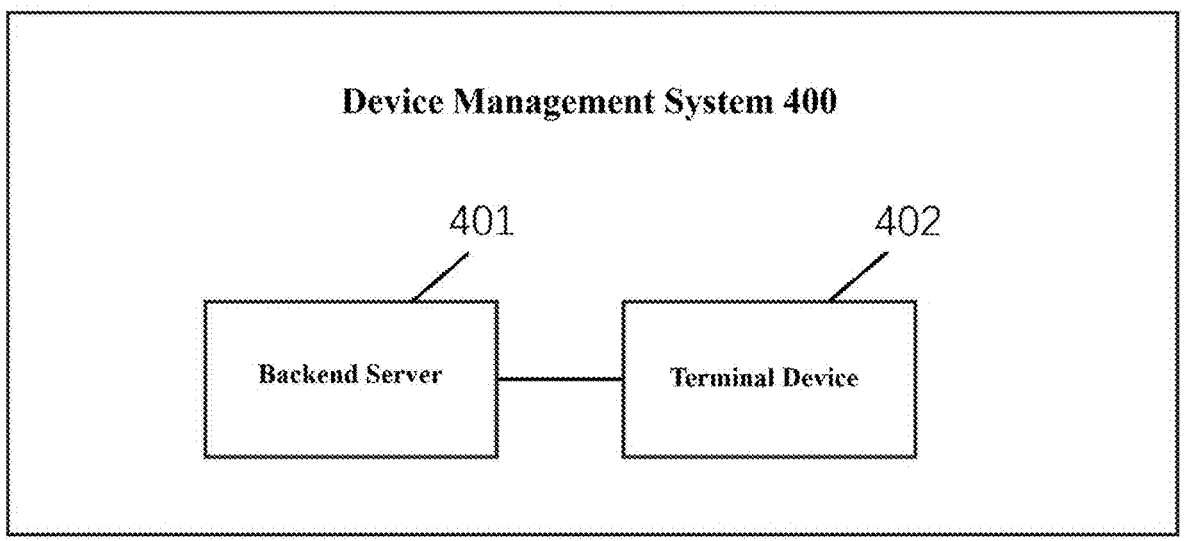
FIG. 4 is a system structure diagram of a device management system provided in the embodiment of the present disclosure.

On the basis of the embodiment corresponding to FIG. 1 described above, FIG. 4 is a system structure diagram of a device management system provided by the embodiment of the present disclosure, where the device management system 400 includes a backend server 401 and a terminal device 402, which are each configured to perform the method in the above method embodiment.

As can be seen, the backend server obtains target QR code information transmitted by a terminal device, where the target QR code information is obtained through scanning a plurality of target QR codes by a scanning interface of the terminal device under a user account, and the plurality of target QR codes are respectively arranged on a plurality of target devices; the backend server determines usage times corresponding to each of the plurality of target devices based on the target QR code information; the backend server generates a usage verification code for using the plurality of target devices and transmits the usage verification code to the terminal device, if the usage times corresponding to each of the plurality of target devices meet usage safety requirements; and the backend server is prevented from generating the usage verification code, if the usage times corresponding to at least one of the plurality of target devices do not meet the usage safety requirements. With the use of the above method, the interaction between the terminal device and the backend server ensures that the usage verification code is obtained by a user only if the usage times of each of the plurality of devices meets the usage safety requirements, this enables the automatic management of the plurality of devices in a surgical assistance system, thereby reducing the management costs and improving the management efficiency.

The embodiment of the present disclosure further provides an electronic device, including: a processor, a memory and a bus. The memory is configured to store machine-readable instructions executable by the processor, the processor is configured to communicate with the memory via the bus when the electronic device is in operation, and the machine-readable instructions, when executed by the processor, cause execution of the following processes:

obtaining, by a backend server, target QR code information transmitted by a terminal device, where the target QR code information is obtained through scanning a plurality of target QR codes by a scanning interface of the terminal device under a user account, and the plurality of target QR codes are respectively arranged on a plurality of target devices;

determining, by the backend server, usage times corresponding to each of the plurality of target devices based on the target QR code information;

generating, by the backend server, a usage verification code for using the plurality of target devices and transmitting the usage verification code to the terminal device, if the usage times corresponding to each of the plurality of target devices meet usage safety requirements; and preventing the backend server from generating the usage verification code, if the usage times corresponding to at least one of the plurality of target devices do not meet the usage safety requirements.

The embodiments of the present disclosure further provide a computer-readable storage medium, storing a computer program that, when executed by a processor, performs the method provided in the above embodiment. The storage medium can be a volatile or non-volatile computer-readable storage medium.

The embodiments of the present disclosure further provide a computer program product, including a computer program, which carries program codes, and the instructions included in the program codes are configured for performing the method provided in the above embodiments, which is specifically described in the above method embodiments and will not be repeated herein.

Each embodiment in the present disclosure is described in a progressive manner, and the same or similar parts between the various embodiments can be referenced to each other, and each embodiment focuses on the differences from other embodiments. In particular, for the apparatus, device and computer-readable storage medium implementation, since they are basically similar to the method implementation, their descriptions are simplified, and the relevant parts can refer to the partial description of the method implementation.

The apparatus, device and computer-readable storage medium provided in the embodiment of the present disclosure each correspond to the method, and thus likewise have similar beneficial technical effects as the corresponding method. Since the beneficial technical effects of the method have been described in detail above, the beneficial technical effects of the apparatus, device, and computer-readable storage medium will not be repeated herein.

Although the spirit and principle of the present disclosure have been described with reference to several specific implementation methods above, it should be understood that the present disclosure is not limited to the disclosed specific implementation methods, and the division of various aspects does not mean that the features in these aspects cannot be combined. The present disclosure is intended to cover various modifications and equivalent arrangements included within the spirit and scope of the appended claims.

What is claimed is:

1. A device management method, comprising:

obtaining, by a backend server, target QR code information transmitted by a terminal device, wherein the target QR code information is obtained through scanning a plurality of target QR codes by a scanning interface of the terminal device under a user account, and the plurality of target QR codes are respectively arranged on a plurality of target devices;

determining, by the backend server, usage times corresponding to each of the plurality of target devices based on the target QR code information;

generating, by the backend server, a usage verification code for using the plurality of target devices and transmitting the usage verification code to the terminal device, if the usage times corresponding to each of the plurality of target devices meet usage safety requirements;

preventing the backend server from generating the usage verification code, if the usage times corresponding to at least one of the plurality of target devices do not meet the usage safety requirements; and in response to a device addition operation on a device management interface of the backend server by an administrator account or a manufacturer account, determining, by the backend server, a device identifier and device type information of a device to be added, and storing the device identifier and the device type information of the device to be added in association with each other, wherein the device type information comprises a device type and the usage safety requirements corresponding to the device type.

2. The method according to claim 1, wherein the determining, by the backend server, the usage times corresponding to each of the plurality of target devices based on the target QR code information comprises:

determining, by the backend server, a device identifier corresponding to each of the plurality of target devices based on the target QR code information; and determining, by the backend server, the usage times corresponding to each of the plurality of target devices based on the device identifier corresponding to each of the plurality of target devices and a previously stored correspondence between the device identifier and the usage times corresponding to each of the plurality of target devices.

3. The method according to claim 1, further comprising:
in response to a device type processing operation on a device type management interface of the backend server by an administrator account, determining, by the backend server, device type information and device identifier rules of a device type to be processed, and storing the device type information and the device identifier rules in association with each other, wherein the device identifier rules comprise generation rules of the device identifier.

4. The method according to claim 3, further comprising:
in response to a device identifier rule creation operation on a device identifier rule interface of the backend server by an administrator account, creating, by the backend server, the device identifier rules corresponding to the device identifier rule creation operation.

5. The method according to claim 2, further comprising:
storing, by the backend server, a manufacturer identifier in the device identifier and a corresponding manufacturer name in association with each other, in response to a manufacturer management operation on a manufacturer management interface of the backend server by an administrator account.

6. The method according to claim 1, further comprising:
determining, by the backend server, at least one usage verification code group and a user account corresponding to each usage verification code group, and storing each usage verification code group and the corresponding user account in association with each other, in response to a usage verification code grouping operation on a usage verification code grouping interface of the backend server by an administrator account.

7. The method according to claim 6, wherein the obtaining the target QR code information transmitted by the terminal device comprises:
obtaining, by the backend server, the target QR code information and user account information transmitted by the terminal device, wherein the user account information is information corresponding to the user account that is logged in when the plurality of target QR codes are scanned respectively by the scanning interface of the terminal device;
wherein the generating the usage verification code for using the plurality of target devices by the backend server comprises:
determining, by the backend server, a target usage verification code group corresponding to the user account information based on the user account information and a user account corresponding to each of the previously stored usage verification code groups, in response to a usage verification code group generation operation on a usage verification code management interface of the backend server by an administrator account; and
generating, by the backend server, the usage verification code corresponding to the target usage verification code group.

8. The method according to claim 1, wherein after transmitting the usage verification code to the terminal device, the method further comprises:
determining, by the backend server, the associated information corresponding to the usage verification code, and displaying the associated information corresponding to the usage verification code on the usage verification code recording interface of the backend server, wherein the associated information comprises an acquisition time of the usage verification code and the corresponding plurality of target devices.

9. The method according to claim 1, further comprising:
storing, by the backend server, an authorized user account and authorized user information in association with each other, in response to a user management operation on a user management interface of the backend server by an administrator account.

10. The method according to claim 1, wherein the plurality of target devices comprise a delivery catheter adapter, a guide catheter adapter, and a sheath adapter.

11. A device management method, comprising:
obtaining, by a terminal device, target QR code information corresponding to a plurality of target QR codes, in response to a scanning operation of respectively scanning the plurality of target QR codes by a scanning interface of the terminal device under a user account, wherein the plurality of target QR codes are respectively arranged on a plurality of target devices;
transmitting, by the terminal device, the target QR code information to a backend server;
receiving, by the terminal device, a usage verification code for using the plurality of target devices that is generated and transmitted by the backend server, if usage times corresponding to each of the plurality of target devices determined by the backend server based on the target QR code information meet usage safety requirements; and
in response to a device addition operation on a device management interface of the backend server by an administrator account or a manufacturer account, determining, by the backend server, a device identifier and device type information of a device to be added, and storing the device identifier and the device type information of the device to be added in association with each other, wherein the device type information comprises a device type and the usage safety requirements corresponding to the device type.

12. The method according to claim 11, further comprising:
determining, by the terminal device, that the user account is logged in and displaying the scanning interface of the terminal device to the user account, in response to a login operation on a login interface of the terminal device by the user account.

13. A device management apparatus, comprising:
an acquisition unit configured for a backend server to obtain target QR code information transmitted by a terminal device, wherein the target QR code information is obtained through scanning a plurality of target QR codes by a scanning interface of the terminal device under a user account, and the plurality of target QR codes are respectively arranged on a plurality of target devices;
a determination unit configured for the backend server to determine usage times corresponding to each of the plurality of target devices based on the target QR code information; and a generation unit configured for the backend server to generate a usage verification code for using the plurality of target devices and transmit the usage verification code to the terminal device if the usage times corresponding to each of the plurality of target devices meet usage safety requirements, and to prevent the backend server from generating the usage verification code if the usage times of at least one of the plurality of target devices do not meet the usage safety requirements, wherein in response to a device addition operation on a device management interface of the backend server by an administrator account or a manufacturer account, the backend server determines a device identifier and device type information of a device to be added, and stores the device identifier and the device type information of the device to be added in association with each other, and wherein the device type information comprises a device type and the usage safety requirements corresponding to the device type.

14. A device management apparatus, comprising:

an obtaining unit configured for a terminal device to obtain target QR code information corresponding to a plurality of target QR codes, in response to a scanning operation of respectively scanning the plurality of target QR codes by a scanning interface of the terminal device under a user account, wherein the plurality of target QR codes are respectively arranged on a plurality of target devices;

a transmission unit configured for the terminal device to transmit the target QR code information to a backend server; and a reception unit configured for the terminal device to receive a usage verification code generated and transmitted by the backend server for using the plurality of target devices, if usage times corresponding to each of the plurality of target devices determined by the backend server based on the target QR code information meet usage safety requirements, wherein in response to a device addition operation on a device management interface of the backend server by an administrator account or a manufacturer account, the backend server determines a device identifier and device type information of a device to be added, and stores the device identifier and the device type information of the device to be added in association with each other, and wherein the device type information comprises a device type and the usage safety requirements corresponding to the device type.

* * * * *